US007013869B2

(12) United States Patent
Nagano et al.

(10) Patent No.: US 7,013,869 B2
(45) Date of Patent: Mar. 21, 2006

(54) FUEL SUPPLY SYSTEM FOR INTERNAL COMBUSTION ENGINE

(75) Inventors: Masami Nagano, Hitachinaka (JP); Takanobu Ichihara, Hitachinaka (JP); Hiroaki Saeki, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 154 days.

(21) Appl. No.: 10/681,245

(22) Filed: Oct. 9, 2003

(65) Prior Publication Data

US 2005/0022783 A1 Feb. 3, 2005

(30) Foreign Application Priority Data

Oct. 10, 2002 (JP) ............................. 2002-296873

(51) Int. Cl.
F02D 41/00 (2006.01)
(52) U.S. Cl. ................. 123/339.23; 123/543; 123/545; 123/549; 123/179.21
(58) Field of Classification Search ........... 123/339.23, 123/491, 179.3, 179.15, 179.21, 543, 545, 123/549, 337
See application file for complete search history.

(56) References Cited

U.S. PATENT DOCUMENTS

| 5,873,354 A | * | 2/1999 | Krohn et al. ................ 123/549 |
| 5,894,832 A | | 4/1999 | Nogi et al. |
| 6,776,142 B1 | * | 8/2004 | Sukegawa et al. .......... 123/478 |

* cited by examiner

*Primary Examiner*—Bibhu Mohanty
(74) *Attorney, Agent, or Firm*—Crowell & Moring LLP

(57) ABSTRACT

The present invention provides an electronically-controlled fuel injector, for an internal combustion engine, comprising a downstream fuel injection valve located near an air intake port of each cylinder or inside a cylinder, an air intake passage which bypasses the throttle valve located upstream of a downstream fuel injection valve, and a fuel vaporizing section including an upstream fuel injection valve, and a heater which vaporizes fuel injected from the upstream fuel injection valve; and further having an air intake port located upstream of the throttle valve, air flow control section for controlling an amount of air, said fuel vaporizing section, vaporized-fuel branch section for supplying vaporized fuel to each cylinder, and a vaporized-fuel distribution passage which extends from the vaporized-fuel branch section to an opening located in each air intake pipe located downstream of the throttle valve.

13 Claims, 14 Drawing Sheets

FUEL SUPPLY SYSTEM FOR INTERNAL COMBUSTION ENGINE

BACKGROUND OF THE INVENTION

The present invention relates to a fuel supply system for an internal combustion engine.

Using conventional technology, a system has been devised for heating fuel, which is injected from an upstream fuel injection valve, by means of a heater located in an air intake passage to vaporize it, thereby reducing fuel accumulating in the air intake passage or an air intake valve, resulting in improving combustion especially at the cool engine start-up period and also reducing displacement of toxic hydrocarbon.

For example, such a system comprising a vaporized-fuel supply system, which heats fuel injected from a fuel injection valve and vaporizes it, has been disclosed in U.S. Pat. No. 5,894,832. The disclosed system is designed such that a downstream fuel injection valve is located near the air intake port of each cylinder, and an upstream fuel injection valve and a heater are located in an auxiliary air passage which bypasses an upstream throttle valve so that fuel from the upstream fuel injection valve is injected toward the heater during the engine warm-up period and is vaporized by the heater, thereby preventing fuel from accumulating in the air intake passage resulting in improved combustion.

However, according to the conventional technology, if fuel is supplied from a fuel vaporizer located upstream of the air intake passage at the engine start-up time, a large volume of air located downstream of the throttle valve in the air intake pipe is supplied to the cylinder prior to the supply of the vaporized fuel. Accordingly, a problem arises in that the time for start-up becoming longer than an MPI system, for example, which does not apply a conventional fuel vaporizer.

Furthermore, when vaporized-fuel begins to be supplied, several cylinders do not receive the necessary predetermined combustible air-fuel ratio; therefore, creating another problem of the occurrence of flameout which prevents the reduction of HC.

SUMMARY OF THE INVENTION

To solve the above problems, the present invention provides a fuel supply system, for an internal combustion engine, having a fuel vaporizer, and further having a dedicated passage for vaporized fuel so as to quickly supply vaporized fuel at the start-up time wherein the dedicated passage for vaporized fuel branches into an air intake pipe for each cylinder thereby channeling and injecting vaporized-fuel sent from the fuel vaporizer.

DETAILED DESCRIPTION OF THE PREFERRED EMBODIMENTS

In the above system that applies conventional technology, vaporizing fuel improves combustion. Therefore, during idling period after engine start-up, if fuel is heated and vaporized by a heater and spark delay in the ignition timing is set greater than that of a conventional engine without a heater, exhaust temperature increases thereby activating a catalyst. As a result, there is an advantage that displacement of toxic hydrocarbon (HC) is reduced when the cool engine begins to warm up.

Figure 13:
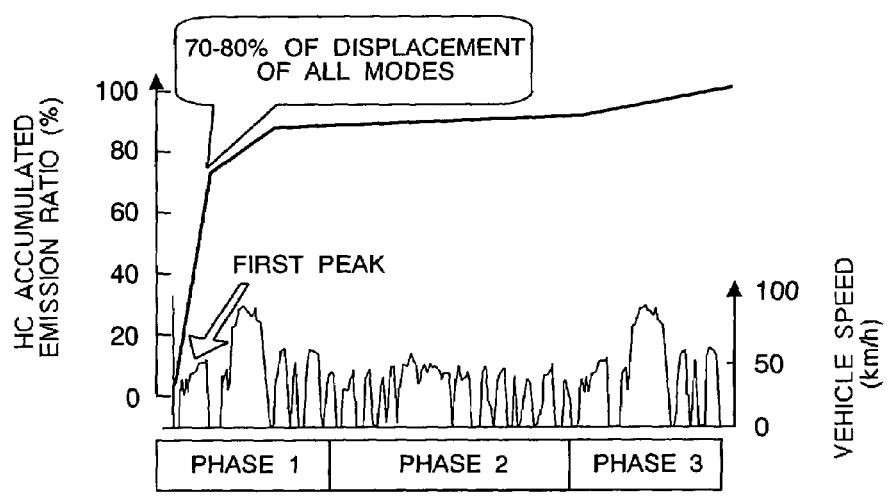
FIG. 13 shows the exhaust gas measuring mode in the United States.

Recently, from the aspect of environment preservation, exhaust gas emission control is becoming strict in the United States and other countries in the world. Mainly, exhaust gas is emitted before catalyst is activated. FIG. 13 shows the hydrocarbon (HC) emission conditions when a vehicle travels in the U.S. standard exhaust gas measuring mode (LA4-CH). Approximately 70 to 80% of displacement in all modes was emitted at one peak before catalyst is activated.

There are two countermeasure technologies: improving combustion to reduce displacement from an engine, and quickly activating catalyst. The purpose of the present invention is to improve combustion and reduce displacement from an engine.

Accordingly, the present invention provides a fuel injector or a fuel supply system, for an internal combustion engine, comprising a downstream fuel injection valve located near an air intake port of each cylinder or inside each cylinder, and a fuel vaporizing section including an upstream fuel injection valve located in an air intake passage which bypasses the throttle valve located upstream of a downstream fuel injection valve and a heater which vaporizes fuel injected from the upstream fuel injection valve; and further having a vaporized-fuel conveying passage for supplying vaporized-fuel sent from the fuel vaporizing section to each cylinder wherein the vaporized-fuel conveying passage consists of a vaporized-fuel branch section (joint section) and a vaporized-fuel distribution passage extending from said vaporized-fuel branch section to the opening located in each air intake pipe located downstream of the throttle valve.

Furthermore, uniting the vaporized-fuel branch section and the vaporized-fuel distribution passage with the air intake pipe improves the installation, reduces the size of the system and provides for a reasonably priced system.

In the present invention, an opening of the vaporized-fuel distribution passage located in each air intake pipe is designed to be smaller than the section of the distribution passage.

In the present invention, an air flow is generated in the cylinder of an internal combustion engine.

In the present invention, concerning the length of the vaporized-fuel conveying passage, the shortest passage between those cylinders that have overlapping air intake timing is longer than the shortest passage between those cylinders that do not have overlapping air intake timing.

In the present invention, the cross-sectional area of the vaporized-fuel branch section which is connected to a plurality of cylinders is locally enlarged in the vicinity of the upstream cylinder.

In the present invention, an orifice is disposed in the vaporized-fuel distribution passage which is connected to each cylinder, and the diameter of the orifice varies according to each cylinder, and the orifice is located slightly upstream of the vaporized-fuel distribution passage.

In the present invention, the vaporized-fuel conveying passage is made of resin.

The present invention has an air volume control section for controlling the amount of air flowing through said air intake passage located in said bypass passage.

In the present invention, the air volume control section controls the amount of air necessary for atomizing fuel injected from a fuel injection valve constituting a vaporizer and also controls the amount of air necessary for conveying vaporized fuel.

An air volume control section used for the present invention also controls the amount of air so that the predetermined number of revolutions of the internal combustion engine can be attained, thereby making an additional revolutions control section unnecessary.

In the present invention, the necessary fuel for one combustion is injected from the upstream fuel injection valve, which constitutes said fuel vaporizing section, at least in twice per air intake, thereby reducing variations in each cylinder's air-fuel ratio.

In the present invention, fuel injection is performed according to a predetermined degree of the crank angle.

In the present invention, after a second time, fuel is injected according to a different degree of the crank angle or the time.

In the present invention, the number of fuel injections increases as the temperature of the internal combustion engine decreases.

Now, embodiments of the present invention will be described below. First, with reference to FIG. 14, a system that uses a fuel vaporizer 30 (hereafter, referred to as "CSD") is explained. An intake air sensor 7 and a throttle valve 8 are disposed in an air intake passage 6 of an engine. A downstream fuel injection valve 2 is disposed at the inlet of the air intake port of each cylinder. An upstream section of the air intake passage is equipped with an air-assist type microminiaturizing injection valve (upstream fuel injection valve) 3 and an air passage 11 which introduces air for atomizing fuel from upstream of the throttle valve 8 and supplies it to the upstream fuel injection valve 3.

It is generally known that if the size of injected fuel particles is atomized to approximately 10 microns, the atomized fuel flows into the cylinder without adhering to the air intake passage. Therefore, to reduce fuel that adheres to the air intake passage, fuel injected form the upstream fuel injection valve 3 is atomized to approximately 10 microns. A heater (heater member) 4 is disposed in the direction of injection coming from the upstream fuel injection valve 3.

For example, a PTC heater which is capable of maintaining a constant temperature can be used for a heater 4. Current is supplied to the heater 4 from a battery 12 via a heater relay 13. The electrical current flowing through the heater is detected by a terminal voltage of a resistance 20 for the current detection.

Furthermore, an auxiliary air passage 9 for bypassing the throttle valve 8 is equipped with an idle speed control valve 10 (hereafter, abbreviated as "ISC valve") for controlling the amount of air. Herein, the outlet of the auxiliary air passage 9 is formed such that air can flow toward the heater 4. The size of fuel particles injected from the upstream fuel injection valve 3 varies slightly and some large fuel particles exist. However, small fuel particles injected from the upstream fuel injection valve 3 are carried downstream by an air flow and directly flow into the cylinder. On the other hand, large fuel particles are vaporized by the heater 4 and then supplied to the cylinder. Thus, the heater 4 is designed to reduce power consumption.

Figure 14:
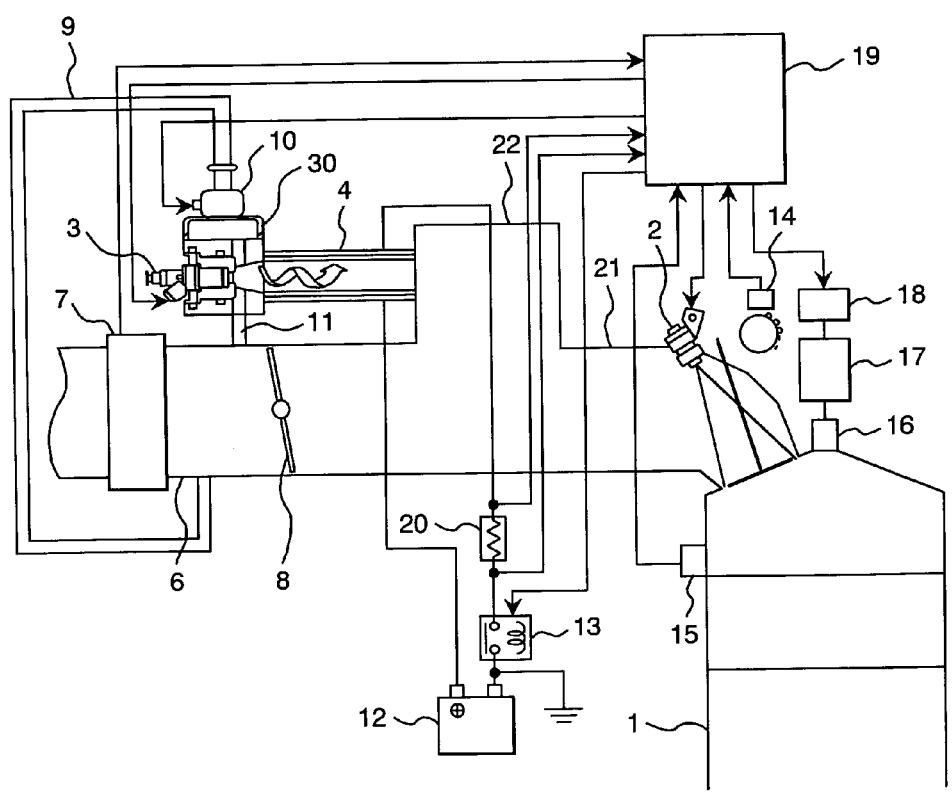
FIG. 14 illustrates a system configuration according to the present invention.
Figure 15:
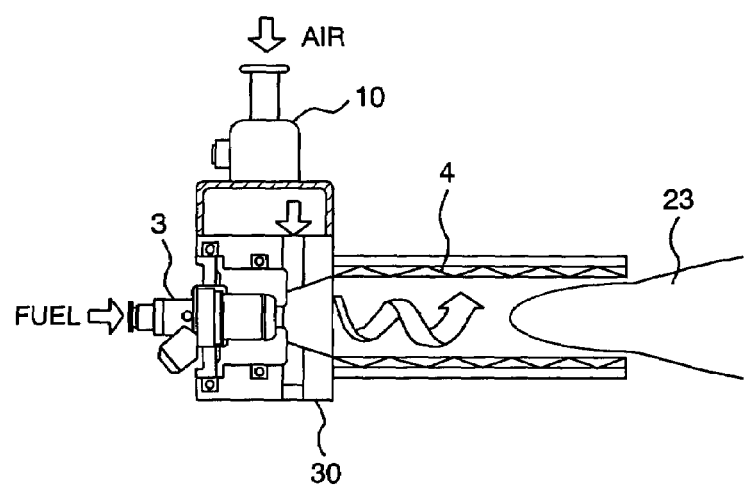
FIG. 15 illustrates a fuel vaporizer according to the present invention.

FIG. 15 is an enlarged view of the CSD (fuel vaporizer) 30 shown in FIG. 14. In this configuration, fuel injected from the upstream fuel injection valve 3 is swiveled by air supplied from said auxiliary air passage 9 and large fuel particles are vaporized by the heater 4.

An internal combustion engine 1 is equipped with a crank angle sensor 14 for detecting rotation speed and a cooling water temperature sensor 15 for detecting cooling water temperature, and as an ignition system, it is also equipped with an ignition plug 16, ignition coil 17, and a power switch 18. Signals from each sensor are inputted into a control unit 19 which controls a downstream fuel injection valve 2, upstream fuel injection valve 3, heater 4, heater relay 13, ISC valve 10, and the power switch 18.

Figure 16:
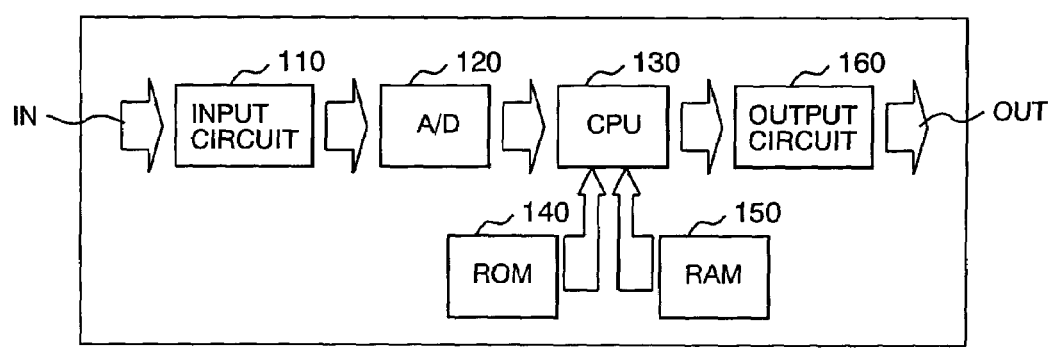
FIG. 16 is an explanatory drawing for a control unit incorporated into the present invention.

Next, with reference to FIG. 16, configuration of an engine control unit 19 used for this embodiment will be described. The engine control unit 19 includes an input circuit 110, A/D conversion section 120, central processing unit (CPU) 130, ROM 140, RAM 150 and output circuit 160.

For example, input signals IN which are inputted into an input circuit 110 include signals sent from an intake air sensor 7, crank angle sensor 14, and a cooling water temperature sensor 15 shown in FIG. 14. Noise components are removed from those input signals IN and input signals IN are then outputted to an A/D conversion section 120. The A/D conversion section 120 converts signals inputted from the input circuit 110 and then outputs the converted signals to the central processing unit 130. The central processing unit 130 receives A/D conversion results sent from the A/D conversion section 120 and executes a predetermined program stored in ROM 140, thereby executing individual control and diagnosis.

Computation result and A/D conversion result are temporarily stored in RAM 150. Also, the computation result is outputted as a control output signal via an output circuit 160 for the purpose of controlling the upstream fuel injection valve 3, ISC valve 10, and the heater relay 13.

Figure 17:
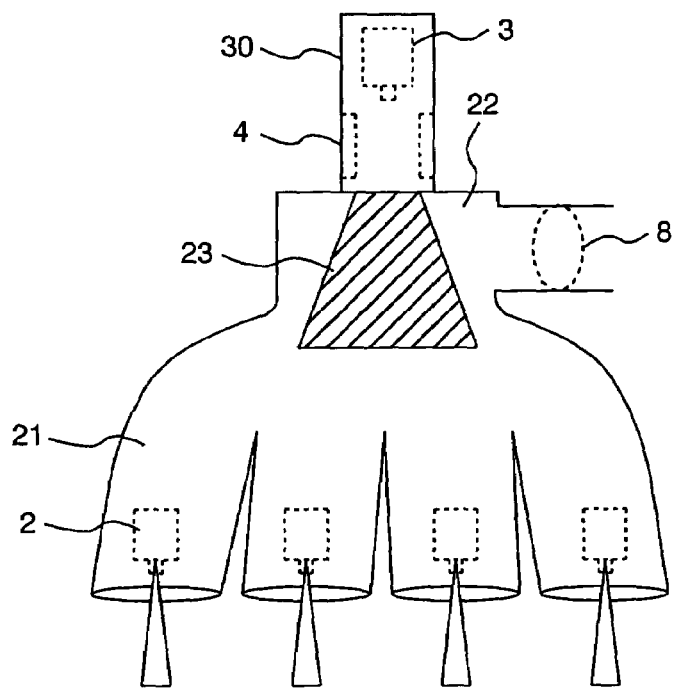
FIG. 17 shows the details of FIG. 14.
Figure 18:
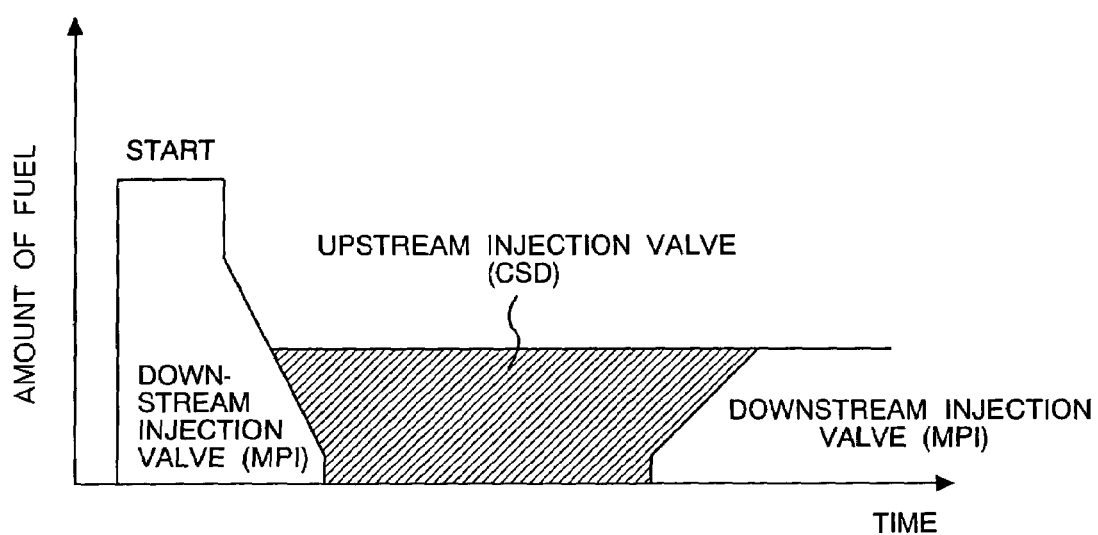
FIG. 18 shows the control mechanism of a conventional downstream fuel injection valve and an upstream injection valve for vaporized fuel.

Prior to description of the present invention, first, with reference to FIG. 17, the installation position of said CSD will be described. The CSD is mounted to a joint section (hereafter, referred to as "collector") 22 of air intake pipes. This configuration allows fuel injected from the upstream fuel injection valve 3 during the start-up and warm-up period to be vaporized by the heater 4 and then the vaporized fuel 23 to be supplied to all cylinders. An air intake pipe 21 for each cylinder has a downstream fuel injection valve 2. Conventionally, an upstream fuel injection valve 3 for CSD and a downstream fuel injection valve 2 for port injection are used as shown in FIG. 18. That is, at the engine start-up time, a downstream fuel injection valve 2 (conventional MPI) is used, and when an engine comes to run by itself (hereafter, referred to as "complete explosion"), the valve is switched to an upstream fuel injection valve 3 (CSD), and then changed to an MPI prior to drive.

The reason why this type of system is adopted will be described later. However, there is a problem with using a CSD 30 to start an engine; a large volume of air is present downstream of the throttle valve 8 located in the air intake pipe 21, and first the air is supplied to the cylinder and then vaporized fuel is supplied, causing a longer start-up time than that of the MPI system. Moreover, there is another problem that when vaporized-fuel begins to be supplied, several cylinders do not receive the necessary predetermined combustible air-fuel ratio; therefore, creating flameout which prevents the reduction of HC.

Accordingly, the present invention provides a dedicated passage for vaporized-fuel for the CSD to use CSD from the start-up period (i.e. injecting fuel from the upstream fuel injection valve 3).

Figure 1:
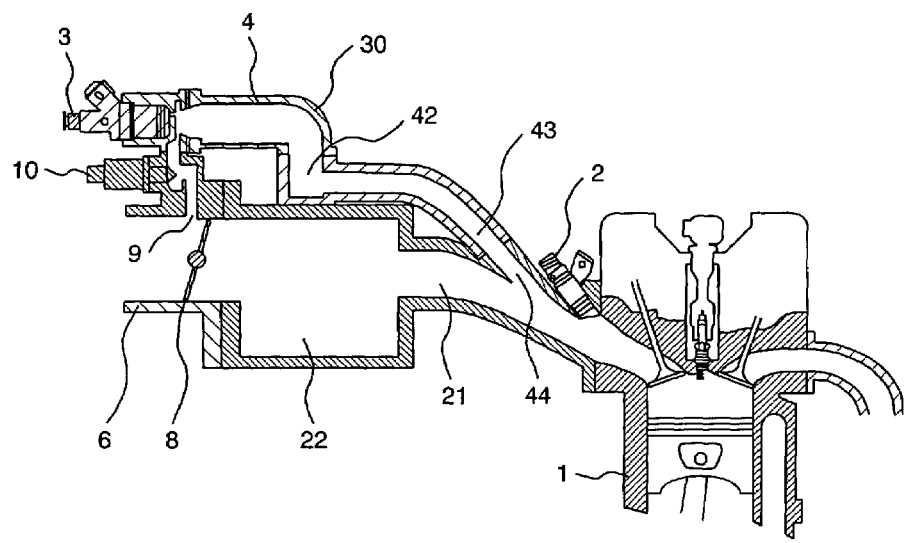
FIG. 1 shows a first embodiment of the present invention.

FIG. 1 shows a first embodiment of the present invention. An air intake port 9 for supplying air to the CSD 30 is disposed upstream of the throttle valve 8, and an ISC valve 10 is located downstream of the air intake port. The ISC valve 10 optimally controls the amount of air required for conveying air necessary for atomizing fuel injected from the fuel injection valve 3 of the CSD 30 as well as conveying vaporized fuel. Fuel vaporized by the CSD 30 is supplied to a vaporized-fuel distribution passage 43 which is extending from the branch section (joint pipe) 42 to an opening 44 located in the air intake pipe 21 for each cylinder. The capacity of the branch section 42 and the vaporized-fuel distribution passage 43 is designed to be much smaller than the size of main passages 22 and 21.

Figure 2:
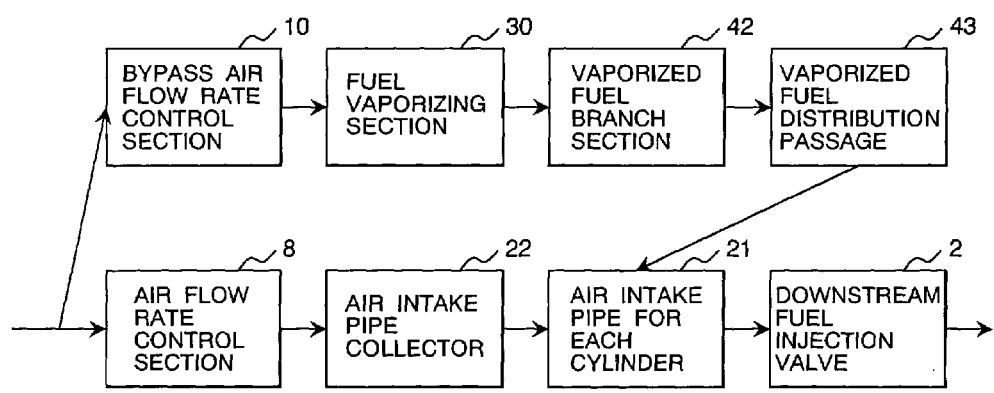
FIG. 2 is a block diagram of an embodiment according to the present invention.

FIG. 2 is a block diagram showing the configuration of the above-mentioned vaporizing passage used for the present invention. In the present invention, the bypass air intake passage section consists of a bypass air flow control section, fuel vaporizing section (CSD), vaporized-fuel branch section and a vaporized-fuel distribution passage, wherein the main air intake passage consists of an air intake pipe (not shown), air flow control section, air intake pipe joint section, and an air intake pipe for each cylinder: and a downstream fuel injector is provided, for each cylinder, downstream of the main air intake passage.

According to the above configuration, the entire capacity of the bypass air intake (vaporizing) passage can be smaller than the capacity of the main air intake passage; consequently, vaporized-fuel is quickly supplied into the cylinder at the engine start-up period, thereby solving the above-mentioned prolonged start-up time and several cylinders' combustible air-fuel ratio not attaining its predetermined value at the start-up period resulting in a flameout and increasing HC (hydrocarbon).

Figure 3:
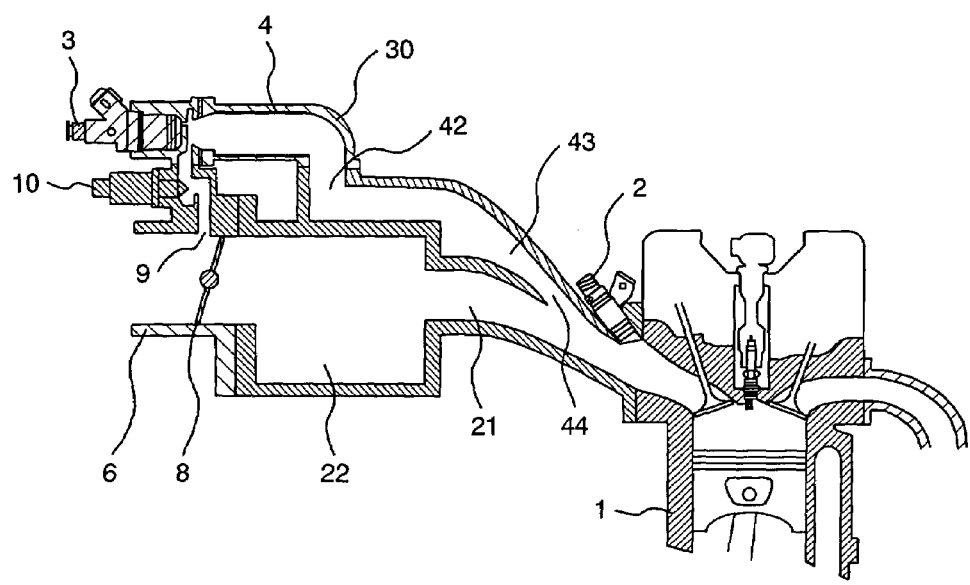
FIG. 3 illustrates a vaporized-fuel conveying passage which is united with the main air intake pipe.
Figure 4:
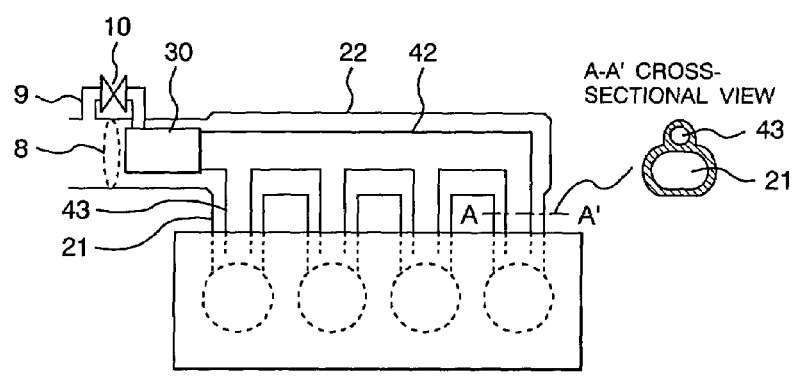
FIG. 4 is a top view and an A–A' sectional view of an internal combustion engine shown in FIG. 3.

The above-mentioned branch section 42 and the vaporized-fuel distribution passage 43 can be provided independently from an air intake pipe 21. However, as shown in FIG. 3, uniting the branch section 42 and said vaporized-fuel distribution passage 43 with the air intake pipe 21 improves installation, reduces the size of the system and provides for a reasonably priced system. FIG. 4 is a top view and a sectional view of the configuration shown in FIG. 3.

Herein, the vaporized-fuel branch section 42 and the vaporized-fuel distribution passage 43 can be made of metal, for example, aluminum; however, because metal is highly thermo-conductive, heat easily dissipates, thereby lowering the temperature of the inner wall of the vaporized-fuel passage causing vaporized fuel near the wall to cool which may cause re-liquefaction.

Therefore, when the branch section (joint pipe) 42 and the vaporized-fuel distribution passage 43 are of separate construction (made of different material) from the air intake pipe 21, by forming the branch section 42 and the vaporized-fuel conveying passage of the vaporized-fuel distribution passage 43 using a low heat-conductive resin, it is possible to prevent the re-liquefaction of fuel and prevent fuel combustion property from deteriorating.

Furthermore, if the air intake pipe 21 is made of resin, by uniting the branch section 42 and the vaporized-fuel conveying passage of the vaporized-fuel distribution passage 43 with the air intake pipe 21, the same effect will be achieved.

According to the above embodiments, it is possible to use resin for forming the bypass air intake passage (vaporized-fuel conveying passage).

Figure 5:
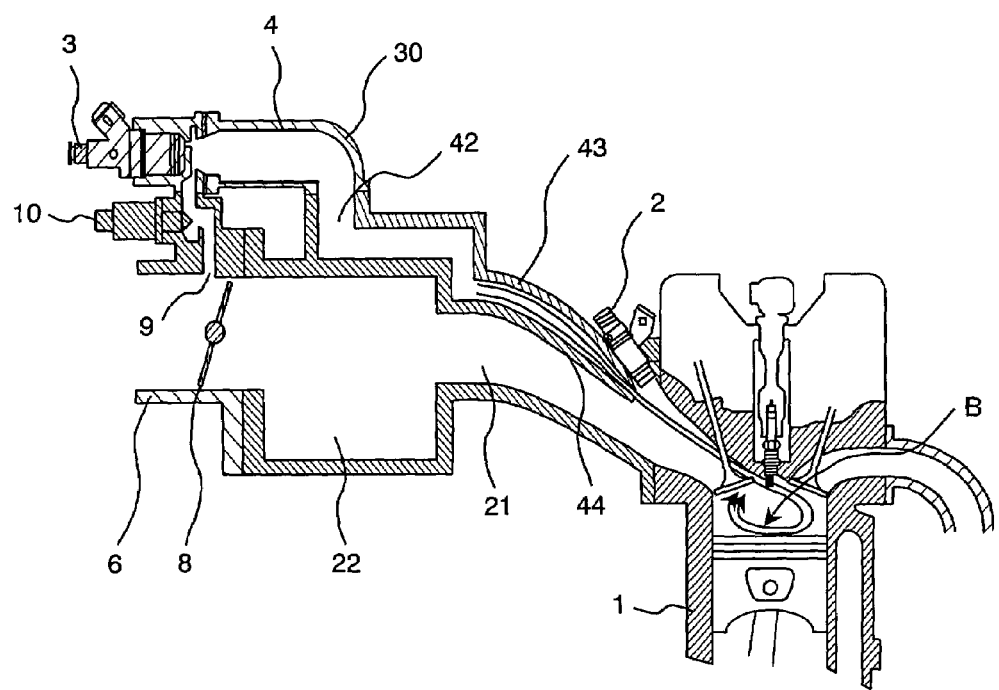
FIG. 5 shows a second embodiment of the present invention.

Next, FIG. 5 shows a second embodiment of the present invention. It shows the configuration of the vaporized-fuel distribution passage 43 wherein an optimal air-fuel mixture occurs in the cylinder of the internal combustion engine 1. To provide directivity for fluid supplied from an opening 44 of the air intake pipe 21, the cross-sectional area of the vaporized-fuel distribution passage 43 gradually tapers toward said opening 44, and said opening 44 is located upward direction of the air intake valve of the internal combustion engine 1 thereby a vortex of fluid, that is, vaporized-fuel or air, is generated in the cylinder as shown with B in the drawing. This configuration allows an optimal air-fuel mixture to occur in the cylinder.

Next, a third embodiment of the present invention will be described. Fuel vaporization by the CSD 30 is conducted at the start-up of the cool engine and during the idling period. During driving, fuel is injected, without using the CSD 30, from the downstream injection valve with the ISC valve 10 located upstream of the CSD 30 closed. When the above-mentioned vaporized-fuel conveying passage is added to the air intake pipe 21, it is necessary for the vaporized-fuel conveying passage not to affect engine output and torque while an engine driving because the vaporized-fuel conveying passage extends among air intake pipes 21 for each cylinder. Herein, the area and the length of the passage of each cylinder's air intake pipe 21 have generally been specified for an optimal value so as to improve engine output and torque.

Figure 6:
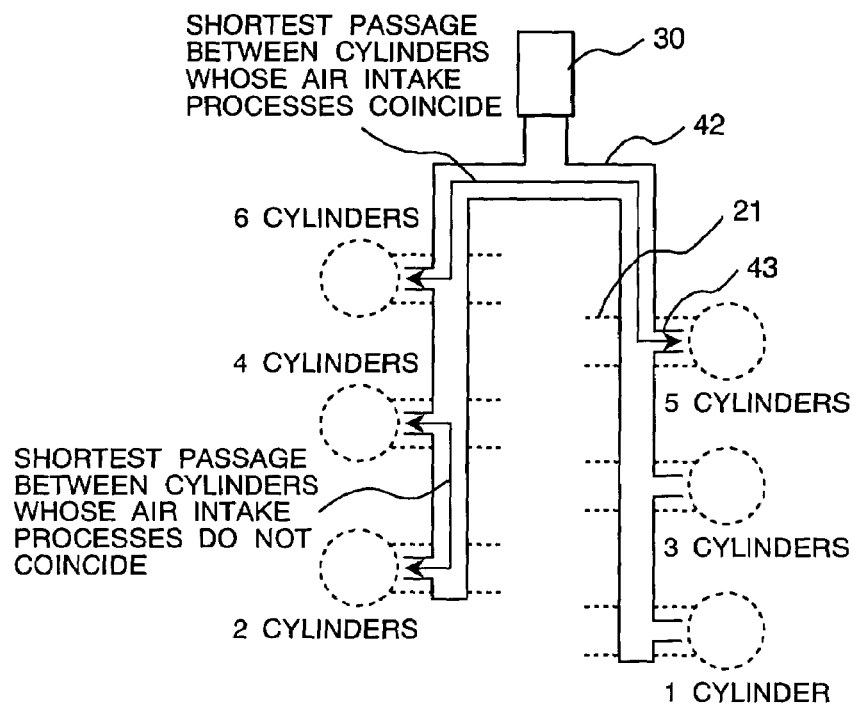
FIG. 6 shows a third embodiment of the present invention.
Figure 7:
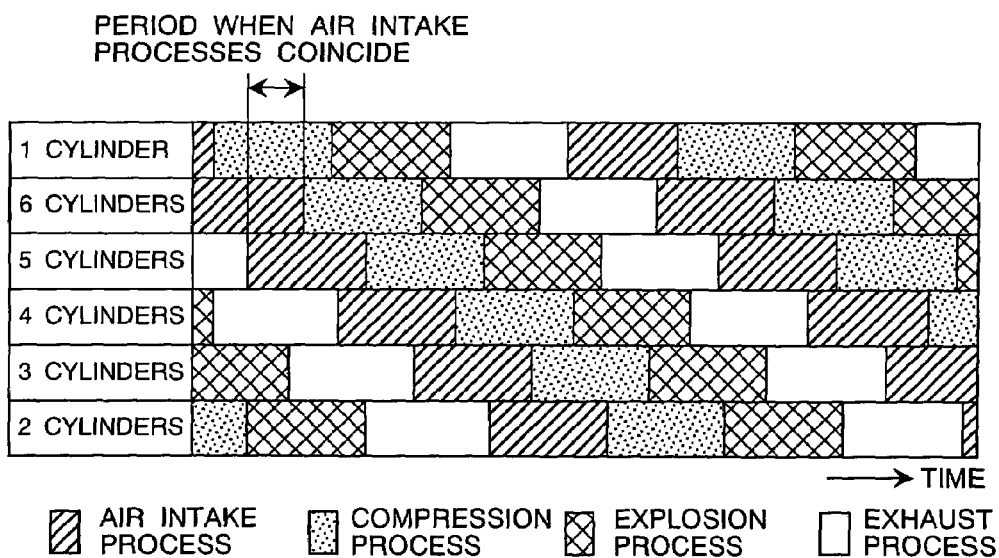
FIG. 7 shows the operation cycle for a V-type, 6-cylinder engine.

FIG. 7 shows the operation cycle for a V-type, 6-cylinder engine. In a multi-cylinder engine with more than 6 cylinders, there is a time period in which more than one cylinders' air intake process overlaps; therefore, a problem concerning charging efficiency occurs. FIG. 6 shows the configuration of a vaporized-fuel conveying passage according to this embodiment. This is designed to prevent charging deficiency in a V-type, 6-cylinder engine with CSD from occurring.

When cylinders' air intake process overlaps, both cylinders compete for intake air through the vaporized-fuel conveying passage thereby decreasing charging efficiency, which may result in low engine output. Therefore, when cylinders' air intake process overlaps, the vaporized-fuel conveying passage is elongated so that one cylinder is not affected by another cylinders operation thereby preventing a decrease in engine output.

Furthermore, when cylinders' air intake process does not overlap, charging efficiency is not effected; therefore, the vaporized-fuel conveying passage is made short so as to prevent a delay in conveying vaporized fuel as well as prevent the re-liquefaction of vaporized fuel.

Figure 8:
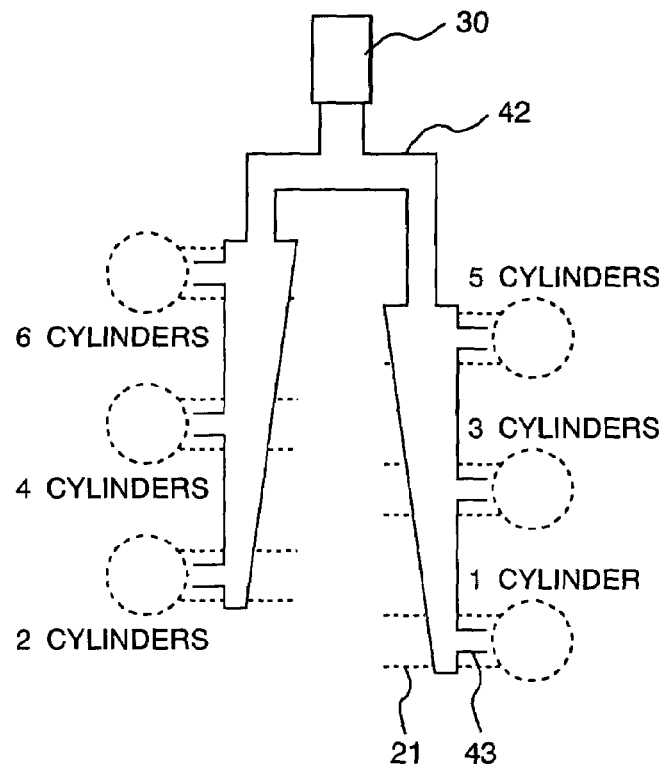
FIG. 8 shows a fourth embodiment of the present invention.

FIG. 8 shows a fourth embodiment of the present invention. A downstream cylinder (1-and 2-cylinder side) with a long vaporized-fuel conveying passage is highly resistant to ventilation in the passage. Therefore, vaporized fuel does not flow easily, and most of the vaporized fuel is supplied to the upstream cylinders (5-and 6-cylinder side) with a short passages located before the downstream cylinder. As a result, distribution of vaporized fuel among cylinders is uneven. To improve the vaporized-fuel distribution among cylinders, the structure is formed such that the diameter of the passage near the upstream cylinder is locally enlarged to reduce resistance to ventilation in the passage so that vaporized fuel can smoothly flow to the downstream cylinder'side. Thus, the system evenly distributes vaporized fuel.

Figure 9:
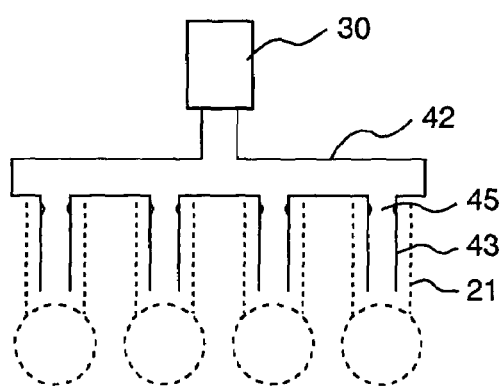
FIG. 9 shows a fifth embodiment of the present invention.

FIG. 9 shows a fifth embodiment of the present invention. It improves fuel distribution among cylinders as does the embodiment shown in FIG. 8. This system is arranged such that an orifice is disposed in the fuel distribution passage. The diameter of the orifice 45 located in the distribution passage 43 on the upstream cylinder side where vaporized fuel easily flows is made smaller than the diameter of the orifice located on the downstream cylinder side.

On the contrary, on the downstream cylinder side where vaporized fuel does not flow easily, to let it flow, the diameter of the orifice 45 in the distribution passage 43 is made a little large or no orifice 45 is disposed. Thus, fuel distribution is made even among cylinders. Furthermore, by installing an orifice 45 at an upstream position, away from an air intake port, in the distribution passage 43, it is possible to prevent the diameter of the orifice 45 from aging due to the effect of contamination caused by spit-back of combustion gas.

Figure 19:
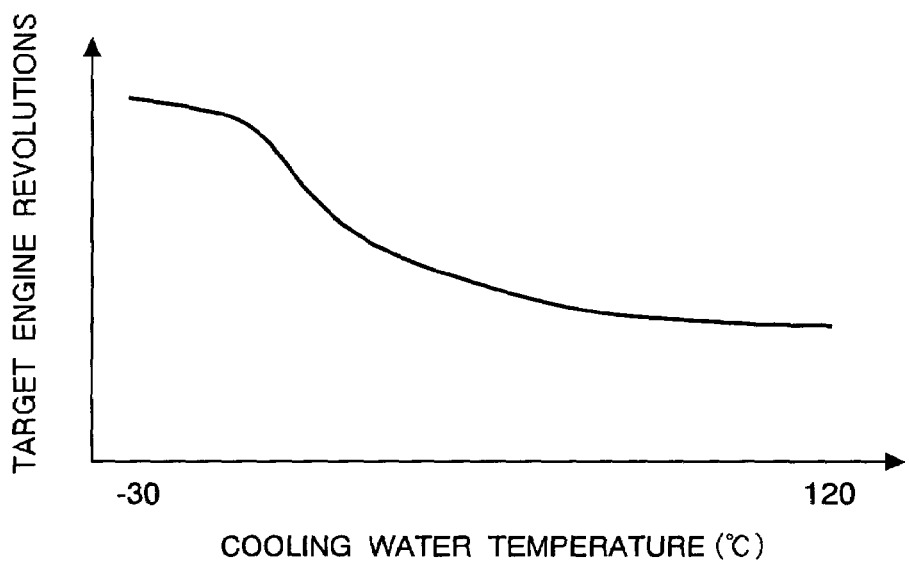
FIG. 19 shows the cooling water temperature and the number of target revolutions.

Next, the ISC valve 10 control mechanism will be explained. In terms of cost reduction of the electronically-controlled fuel injection system, said ISC valve 10 is designed to have an idle speed control function as the name literally indicates. The number of revolutions of the internal combustion engine 1 is determined in advance according to cooling water temperature. FIG. 19 shows the number of target revolutions which correspond to cooling water temperature.

As temperature decreases, the number of revolutions increases, and inversely, as temperature increases, the number of revolutions decreases. In the exhaust gas measuring mode shown in FIG. 13, the temperature of cooling water is set at 25° C. which is the room temperature setting. The number of revolutions at this temperature is generally set at approximately 1,200 to 1,600 r.p.m. depending on the capacity of the internal combustion engine.

Figure 20:
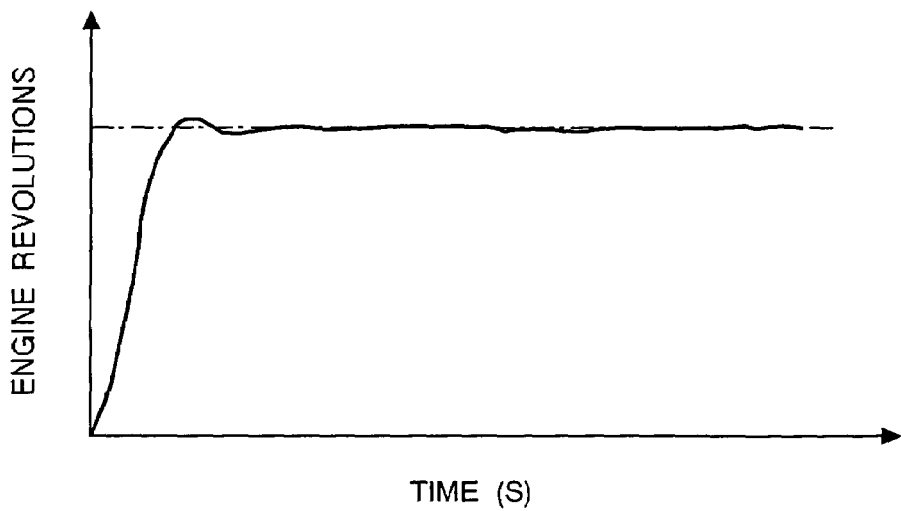
FIG. 20 shows behaviors of revolutions at the engine start-up period.

Therefore, after the engine starts, it is necessary to control the amount of air so that the engine's actual revolutions coincide with the number of target revolutions as shown in FIG. 20. Thus, the idle speed control function is provided. As a result, it is not necessary to adopt another different ISC valve.

Figure 10:
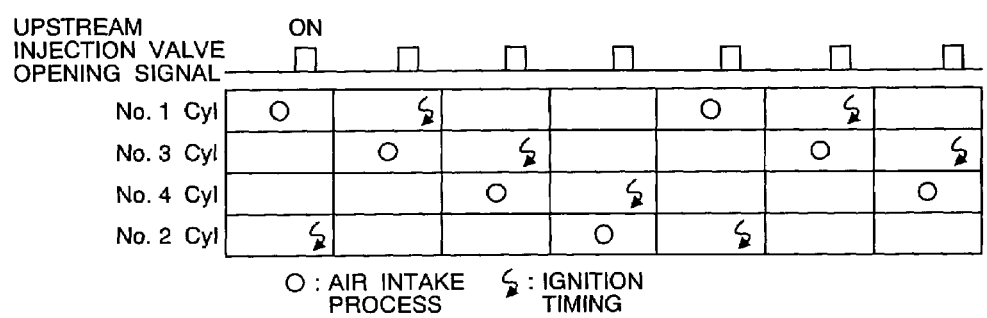
FIG. 10 shows the fuel injection timing at the beginning of the development.

The above configuration enables the reduction of system cost and eliminates installation labor charge. Next, control mechanism of the upstream fuel injection valve 3 which constitutes a CSD 30 used for the present invention. FIG. 10 shows relationships between the intake, compression, explosion and exhaust process in a 4-cylinder engine and the fuel injection timing.

The ○ indicates the intake process, and S-shaped letter with an arrow indicates ignition timing, generally, indicating the compression process. Furthermore, the upstream injection valve opening signal shown on each process indicates the timing for the upstream fuel injection valve 3 to inject fuel. At the beginning of development, the one-air-intake, one-injection system was adopted.

However, vaporized fuel and air are alternately supplied in layers to said vaporized-fuel branch pipe (vaporized-fuel branch section) 42 and the length of the vaporized-fuel conveying passage (vaporized-fuel distribution passage) 43 varies according to each cylinder. Consequently, it was impossible to create an identical air-fuel ratio for each cylinder.

To solve this problem, inventors studied the following two issues: first, to narrow the intervals between the alternating supply of vaporized fuel and air; and second, to optimize injection timing according to the shape and the mounting position of the vaporized-fuel branch pipe 42 and the length of each vaporized-fuel distribution passage 43.

Figure 11:
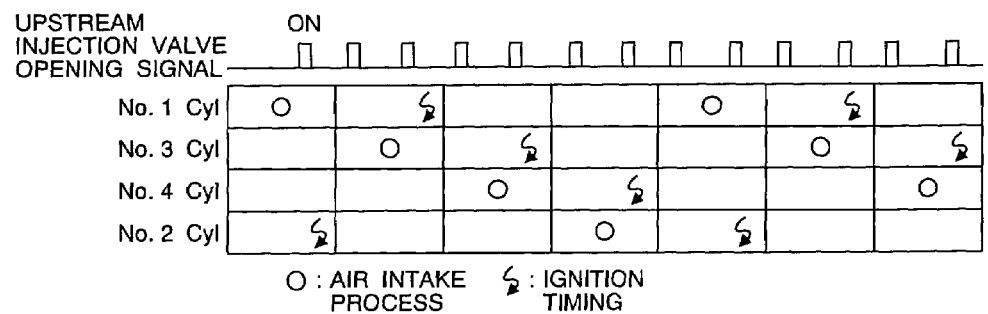
FIG. 11 is a drawing (1) that shows the fuel injection timing for the present invention.
Figure 12:
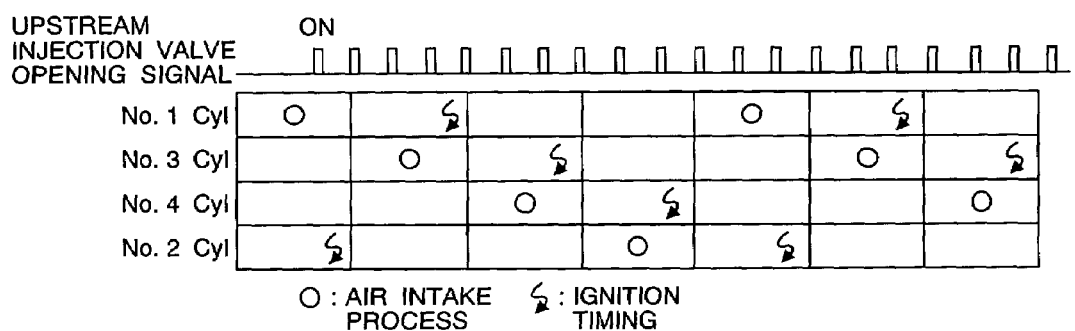
FIG. 12 is a drawing (2) that shows the fuel injection timing for the present invention.

Concerning the first issue above, by increasing the number of injections from the upstream fuel injection valve 3, it is possible to narrow the intervals between the alternating supply of vaporized fuel and air or to let the vaporized fuel continuously flow. The accomplished means is shown in FIG. 11 and FIG. 12. Compared with the system shown in FIG. 10, a system shown in FIG. 11 injects fuel at an intermediate location and a system shown in FIG. 12 injects fuel twice at tripartitioned positions.

Figure 21:
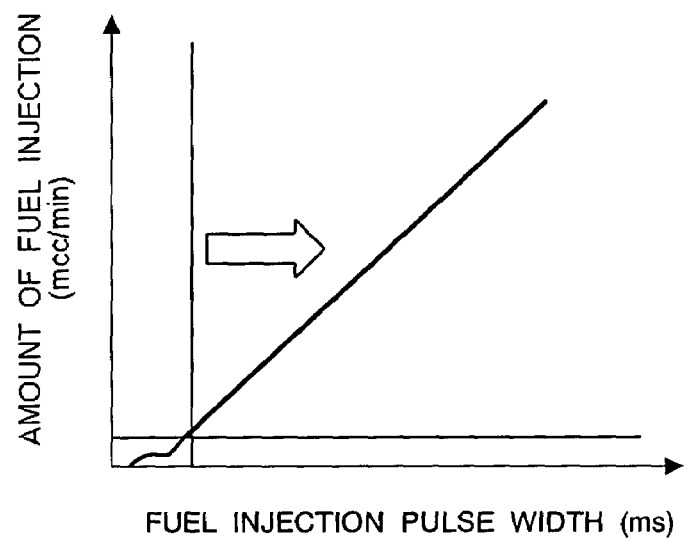
FIG. 21 shows the relationship between the width of the fuel injection pulse and the amount of fuel injection.

The greater the number of injections becomes, the less dispersion of air-fuel ratio among cylinders becomes. However, a fuel injection valve has minimum injection amount. FIG. 21 shows relationships between the width of the fuel injection pulse and the amount of injected fuel. The minimum injection amount is the amount when an error of an amount of injection satisfies a predetermined value. Therefore, if less than the maximum amount of fuel is injected, the amount of injected fuel varies every time, thereby making it impossible to obtain a predetermined air-fuel ratio and creating a dispersion of the air-fuel ratio among cylinders.

In FIG. 21, a fuel injection pulse larger than the value marked with an arrow is used so that linearity of the injection amount characteristics can be provided. The width of the minimum fuel injection pulse is generally 1.3 to 1.6 ms. Allowing for a margin, the number of injections necessary to accumulate enough fuel for one combustion can be as many as three or four. That is the limit. However, the limit of the number of injections changes depending on the capacity of the internal combustion engine 1, capacity of the upstream fuel injection valve 3 and the fuel injection valve drive circuit.

Figure 22:
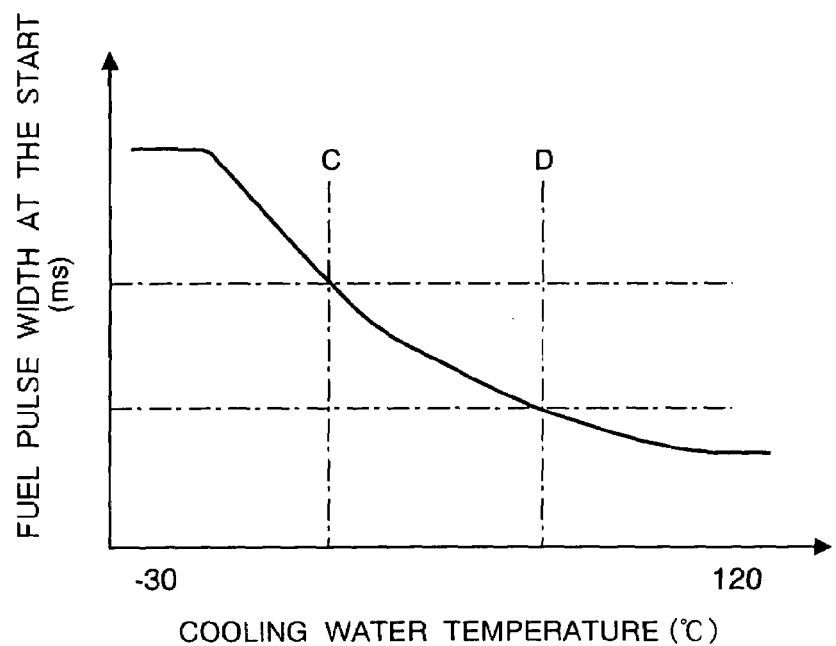
FIG. 22 shows the cooling water temperature and the width of the fuel injection pulse at the engine start-up period.

Furthermore, the amount of fuel injected changes according to cooling water temperature. As temperature of the internal combustion engine 1 decreases, the amount of fuel injection increases; therefore, a large number of fuel injections can be set. FIG. 22 shows relationships between the cooling water temperature and the width of the fuel injection pulse at the engine start-up time. Temperature indicated as D is temperature at which exhaust gas is measured as shown in FIG. 13.

Figure 23:
FIG. 23 is a drawing (1) that shows control mechanism of fuel injection.
Figure 24:
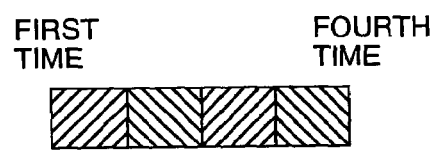
FIG. 24 is a drawing (2) that shows control mechanism of fuel injection.

At that temperature, fuel can be injected twice as shown in FIG. 23, and at temperature indicated as C, fuel can be injected four times as shown in FIG. 24.

Increasing the number of fuel injections makes it possible to reduce dispersion of air-fuel ratio among cylinders; however, the result was not satisfactory enough. The reason was studied and it was found out that there was a limitation of installation of said vaporized-fuel branch pipe 42 and also the length of the air intake pipe 21 differed in each cylinder; as a result, the length of the vaporized-fuel conveying passage 43 differed. This was a probable reason.

Inventors conducted experiments of injection timing. And it was found out that it was more effective to inject fuel from a cylinder with a long vaporized-fuel conveying passage 43 before injecting fuel from a cylinder with a short vaporized-fuel conveying passage 43.

There is an experimental result for a one-air-intake, two-injection system. Concerning said cylinder with a long vaporized-fuel conveying passage 43, it was proved that the optimal injection timings were: the first injection in the vicinity 90° before the top dead center and the second injection in the vicinity of the top dead center.

Concerning said cylinder with a short vaporized-fuel conveying passage 43, it was proved that the optimal injection timings were: the first injection in the vicinity 60° before the top dead center and the second injection in the vicinity 30° after the top dead center. It was also proved that concerning sensitivity to dispersion of air-fuel ratio among cylinders, the first timing is more sensitive than the second timing. Therefore, if the first injection timing is determined based on the degree of the crank angle and the second injection timing and later is determined according to the time instead of the degree of the crank angle, almost the same effect can be expected.

Figure 25:
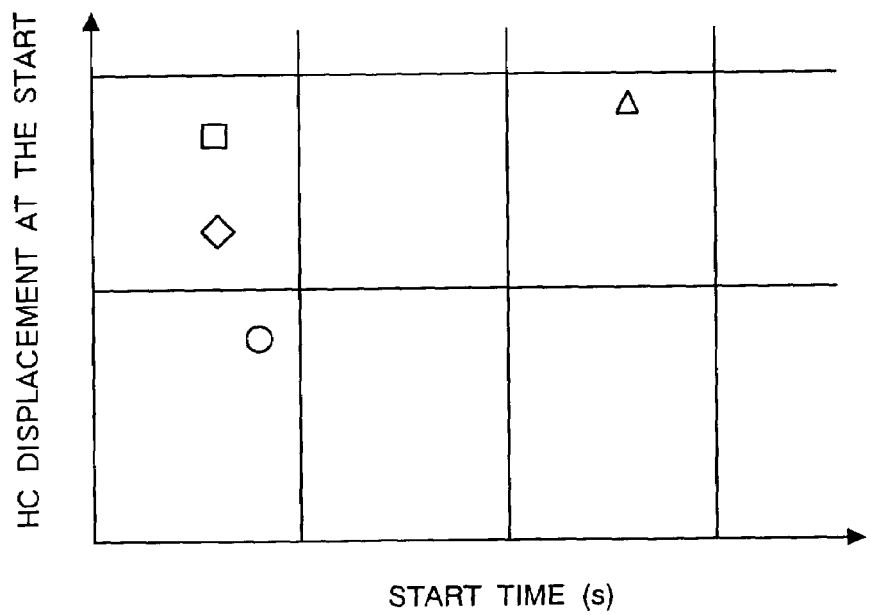
FIG. 25 is a drawing (1) that shows test results using actual vehicles.

Conducting in-vehicle testing, performance of different systems has been compared. Comparison was made among the system consisting of the above-mentioned vaporized-fuel generation system, supply passage and the fuel injection control mechanism; a conventional MPI system; and a system configuration at the development stage shown in FIG. 14. The result is shown in FIG. 25. The horizontal axis indicates start time (S) and the vertical axis indicates the HC displacement at the engine start-up period.

Figure 26:
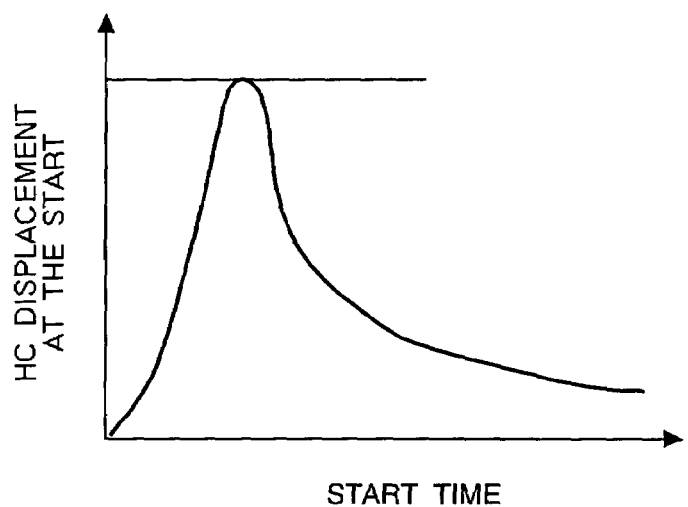
FIG. 26 illustrates the HC peak at the engine start-up period.

The denotes a conventional MPI system, the denotes a system configuration shown in FIG. 14, the denotes a system which applies an MPI system for the start-up process and then switches to a CSD system. The ○ denotes the present invention. Herein, the HC displacement on the vertical axis indicates the peak displacement of hydrocarbon (HC) at the engine start-up period shown in FIG. 26.

The above results prove that the present invention makes it possible to cut emissions of hydrocarbon (HC) at the engine start-up period almost in half of the conventional MPI system while the start-up time is almost equal to that of said conventional MPI system.

Figure 27:
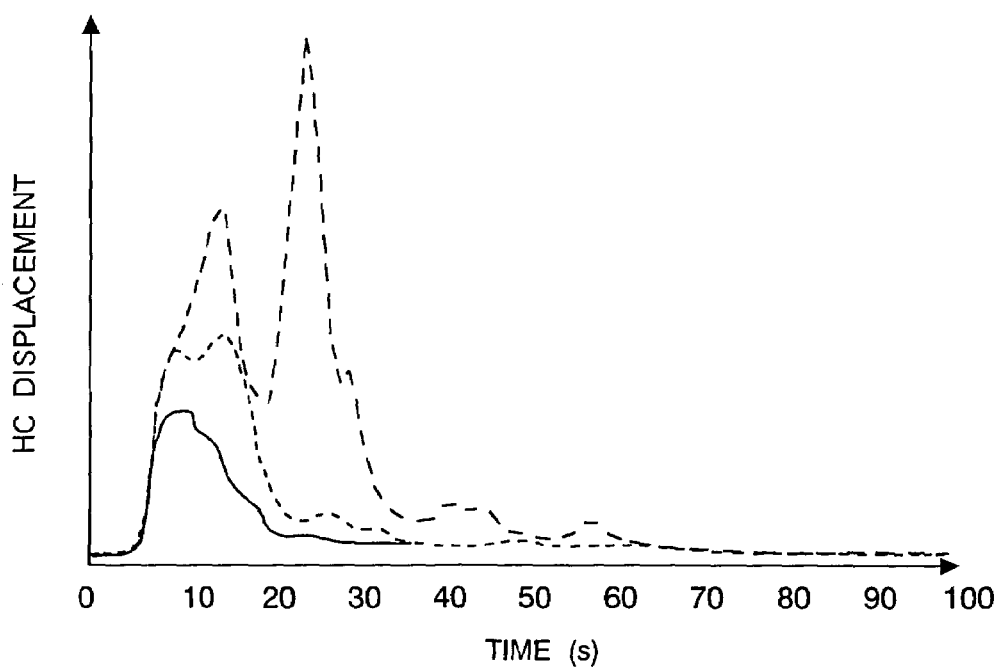
FIG. 27 is a drawing (2) that shows test results using actual vehicles.

Furthermore, FIG. 27 shows the result of measured HC behaviors at the engine start-up period. A thicker broken line indicates the conventional MPI system, a thinner broken line indicates a system configuration at the development stage shown in FIG. 14, and the solid line indicates the present invention. The present invention significantly reduces emission of hydrocarbon (HC) in comparison with said two systems. Concerning the exhaust gas measurement shown in FIG. 13, the area shown in FIG. 26 was calculated. Therefore, the mode measurement result proves that HC emission has been reduced to 59% indicating that the system is highly effective.

Each embodiment mentioned above applies an MPI system which has a fuel injection valve in the vicinity of each cylinder's air intake port; however, it can apply a cylinder injection system which has a fuel injection valve inside the cylinder.

Reference signs show the following parts.

2 . . . downstream fuel injection valve, 3 . . . upstream fuel injection valve, 4 . . . heater member, 6 . . . air intake passage, 8 . . . throttle valve, 10 . . . ISC valve, 19 . . . control unit, 30 . . . fuel vaporizer (CSD), 42 . . . vaporized-fuel branch section, 43 . . . vaporized-fuel distribution passage, 45 . . . orifice located in the vaporized-fuel distribution passage.

As stated above, according to the present invention, the system has an optimal configuration comprising an air flow control section, fuel vaporizing section (CSD), vaporized-fuel branch section and a vaporized-fuel distribution passage; and an amount of fuel necessary for one combustion can be injected from the fuel injection valve of the fuel vaporizing section at least in twice per air intake thereby continuously supplying vaporized fuel.

Consequently, it is possible to use a CSD system from the engine start-up period which results in the reduction of the start-up time as well as the reduction of HC displacement at the start-up period.

What is claimed is:

1. A fuel supply system for an internal combustion engine comprising:

an air intake pipe for taking in air;

a throttle valve disposed in said air intake pipe for controlling an amount of said air;

a downstream fuel injection valve located near an air intake port of a cylinder of an internal combustion engine or inside a cylinder;

a bypass air intake passage for bypassing said throttle valve located upstream of said downstream fuel injection valve;

a fuel vaporizing section including an upstream fuel injection valve connected to said bypass air intake passage; and a heater for vaporizing fuel injected from said upstream fuel injection valve; said bypass air intake passage having a vaporized-fuel branch section for channeling said vaporized fuel to said each cylinder, and a vaporized-fuel distribution passage extending from said vaporized-fuel branch section to an opening located in each air intake pipe located downstream of said throttle valve, wherein concerning the length of said bypass air intake passage, the shortest passage between those cylinders that have overlapping air intake timing is longer than the shortest passage between those cylinders that do not have overlapping air intake timing.

2. A fuel supply system for an internal combustion engine according to claim 1, wherein said vaporized-fuel branch section located in said bypass air intake passage and said vaporized-fuel distribution passage are united with said air intake pipe.

3. A fuel supply system for an internal combustion engine according to claim 1, wherein the cross-sectional area of said opening of said vaporized-fuel distribution passage is made smaller than the cross-sectional area of said vaporized-fuel distribution passage.

4. A fuel supply system for an internal combustion engine according to claim 1, wherein an air flow is generated in the cylinder of an internal combustion engine.

5. A fuel supply system for an internal combustion engine comprising:
   an air intake pipe for taking in air;
   a throttle valve disposed in said air intake pipe for controlling an amount of a downstream fuel injection valve located near an air intake port of a cylinder of an internal combustion engine or inside a cylinder;
   a bypass air intake passage for bypassing said throttle valve located upstream of said downstream fuel injection valve;
   a fuel vaporizing section including an upstream fuel injection valve connected to said bypass air intake passage; and a heater for vaporizing fuel injected from said upstream fuel injection valve; said bypass air intake passage having a vaporized-fuel branch section for channeling said vaporized fuel to said each cylinder, and a vaporized-fuel distribution passage extending from said vaporized-fuel branch section to an opening located in each air intake pipe located downstream of said throttle valve, wherein an orifice is disposed in said vaporized-fuel distribution passage which is connected to each cylinder, and the diameter of the orifice of at least one of said cylinders is different from that of other cylinders, and said orifice is located slightly upstream in said vaporized-fuel distribution passage.

6. A fuel supply system for an internal combustion engine according to claim 1, wherein said bypass air intake passage is made of resin.

7. A fuel supply system for an internal combustion engine according to claim 5, further comprising:
   a bypass air volume control section disposed in said bypass air intake passage for controlling an amount of air flowing from upstream to downstream through said air intake passage.

8. A fuel supply system for an internal combustion engine according to claim 7, wherein said bypass air volume control section controls the amount of air necessary for atomizing fuel injected from an upstream fuel injection valve constituting said fuel vaporizing section and also controls the amount of air necessary for conveying vaporized fuel.

9. A fuel supply system for an internal combustion engine according to claim 8, wherein said air volume control section also controls the amount of air so that the predetermined number of revolutions of the internal combustion engine can be attained.

10. A fuel supply system for an internal combustion engine according to claim 1, wherein the necessary fuel for one combustion is injected from the upstream fuel injection valve constituting said fuel vaporizing section at least in twice per air intake process.

11. A fuel supply system for an internal combustion engine according to claim 10, wherein fuel injection is performed according to a predetermined degree of the crank angle or according to a predetermined fuel injection time.

12. A fuel supply system for an internal combustion engine according to claim 11, wherein from a second fuel injection, fuel is injected according to a different degree of said crank angle or according to different fuel injection time.

13. A fuel supply system for an internal combustion engine according to claim 10, wherein the number of said fuel injections is controlled to increase as the temperature of said internal combustion engine decreases.

* * * * *